United States Patent
Konopka

[11] Patent Number: 6,100,652
[45] Date of Patent: Aug. 8, 2000

[54] BALLAST WITH STARTING CIRCUIT FOR HIGH-INTENSITY DISCHARGE LAMPS

[75] Inventor: John G. Konopka, Barrington, Ill.

[73] Assignee: Osram Sylvania Inc., Danvers, Mass.

[21] Appl. No.: 09/190,497

[22] Filed: Nov. 12, 1998

[51] Int. Cl.[7] .................................................. G05F 1/00
[52] U.S. Cl. ..................... 315/291; 315/224; 315/DIG. 7
[58] Field of Search ................................. 315/307, 224, 315/276, 209 R, 200 R, 209 CD, DIG. 5, DIG. 7, 291

[56] References Cited

U.S. PATENT DOCUMENTS

| | | | |
|---|---|---|---|
| 3,555,352 | 1/1971 | Maksymilian | 315/244 |
| 4,005,336 | 1/1977 | Casella | 315/239 |
| 4,199,710 | 4/1980 | Knoll | 315/205 |
| 4,322,658 | 3/1982 | Minarczyk | 315/47 |
| 4,322,660 | 3/1982 | Johnson | 315/289 |
| 4,334,172 | 6/1982 | Wyner et al. | 315/289 |
| 4,455,510 | 6/1984 | Lesko | 315/263 |
| 4,501,994 | 2/1985 | Spreadbury | 315/307 |
| 4,506,195 | 3/1985 | Elms | 315/205 |
| 4,513,227 | 4/1985 | Labadini et al. | 315/290 |
| 4,629,945 | 12/1986 | Fallier, Jr. et al. | 315/207 |
| 4,678,968 | 7/1987 | Lester | 315/290 |
| 4,683,404 | 7/1987 | Hitchcock | 315/289 |
| 4,723,096 | 2/1988 | Leighty | 315/254 |
| 4,777,410 | 10/1988 | Ottenstein | 315/227 R |
| 4,881,011 | 11/1989 | Britton | 315/209 SC |
| 4,888,528 | 12/1989 | Byszewski et al. | 315/344 |
| 4,958,107 | 9/1990 | Mattas et al. | 315/289 |
| 4,959,593 | 9/1990 | Joanino | 315/290 |
| 5,003,231 | 3/1991 | Perper | 315/291 |
| 5,036,256 | 7/1991 | Garrison et al. | 315/308 |
| 5,051,665 | 9/1991 | Garrison et al. | 315/287 |
| 5,057,750 | 10/1991 | Farrall et al. | 315/248 |
| 5,059,868 | 10/1991 | El-Hamamsy et al. | 315/248 |
| 5,103,140 | 4/1992 | Cocoma et al. | 315/248 |
| 5,107,185 | 4/1992 | El-Hamamsy et al. | 315/248 |
| 5,118,996 | 6/1992 | El-Hamamsy et al. | 315/248 |
| 5,118,997 | 6/1992 | El-Hamamsy | 315/248 |
| 5,159,244 | 10/1992 | Poulson | 315/205 |
| 5,175,476 | 12/1992 | Anderson et al. | 315/248 |
| 5,229,927 | 7/1993 | Vila-Masot et al. | 363/23 |
| 5,319,286 | 6/1994 | Leyten | 315/289 |
| 5,339,005 | 8/1994 | Byszewski et al. | 315/244 |
| 5,391,966 | 2/1995 | Garrison | 315/308 |
| 5,428,268 | 6/1995 | Melis et al. | 315/247 |
| 5,430,354 | 7/1995 | Garbowicz et al. | 315/88 |
| 5,677,602 | 10/1997 | Paul et al. | 315/224 |
| 5,798,615 | 8/1998 | Gasparini et al. | 315/219 |
| 5,869,937 | 2/1999 | Konopka | 315/291 |
| 5,910,712 | 6/1999 | Toyama | 315/307 |
| 5,936,357 | 8/1999 | Crouse et al. | 315/247 |
| 5,952,790 | 9/1999 | Nerone et al. | 315/209 R |

*Primary Examiner*—Don Wong
*Assistant Examiner*—Tuyet T. Vo
*Attorney, Agent, or Firm*—Carlo S. Bessone

[57] ABSTRACT

A ballast (10) for powering a discharge lamp (20) comprises an output circuit (300) and a lamp starting circuit (400). The output circuit (300) includes a resonant inductor (310), a resonant capacitor (312), and a direct current (DC) blocking capacitor (314). Lamp starting circuit (400) is magnetically coupled to the resonant inductor (310) and supplies charging current to the DC blocking capacitor (314). The resulting high voltage that is developed across the DC blocking capacitor (314) ignites the lamp (20). In a preferred embodiment, lamp starting circuit (400) includes a starting winding (402), a current-limiting capacitor (406), a first rectifier (410), and a second rectifier (416).

12 Claims, 2 Drawing Sheets

BALLAST WITH STARTING CIRCUIT FOR HIGH-INTENSITY DISCHARGE LAMPS

FIELD OF THE INVENTION

The present invention relates to the general subject of circuits for powering discharge lamps and, more particularly, to a ballast with a starting circuit for high-intensity discharge lamps.

BACKGROUND OF THE INVENTION

The requirement of a high starting voltage is a well-known characteristic of discharge lamps. Some types of discharge lamps, such as high-intensity discharge (HID) lamps, require starting voltages on the order of several thousand volts.

The prior art teaches a number of ballasts and starting circuits for HID lamps. Many prior art ballasts have starting circuits that employ a pulse coil to generate a narrow high voltage pulse for igniting the lamp. Typically, the pulse coil is located in series with the lamp and must therefore be capable of handling the current that flows through the lamp after the lamp ignites. Because the lamp current is typically quite large (e.g., 700 milliamperes or more), the pulse coil must be wound with fairly large diameter wire in order to keep resistive power losses within a manageable limit and thereby preserve ballast efficiency. Consequently, the pulse coil may have considerable physical size and monetary cost.

"Pulse" type starting circuits typically require breakdown devices such as sidacs. Such devices add significant cost and/or complexity to the starting circuit, and may significantly detract from the overall reliability of the ballast. Moreover, "pulse" type starting circuits are usually ill-suited for use with remote installations in which the length of the wires between the lamp and ballast is more than a few feet. Due to the inherent capacitance of the wiring, the high frequency starting pulse may be significantly attenuated. Consequently, the lamp may not receive sufficient voltage to ignite.

What is needed therefore, is a ballast with a reliable, efficient, and cost-effective starting circuit that provides a high voltage for igniting discharge lamps, that does not require costly magnetics, switches, or breakdown devices, and that is well-suited for remote lamp applications. Such a ballast and starting circuit would represent a considerable advance over the prior art.

DETAILED DESCRIPTION OF THE PREFERRED EMBODIMENTS

Figure 1:
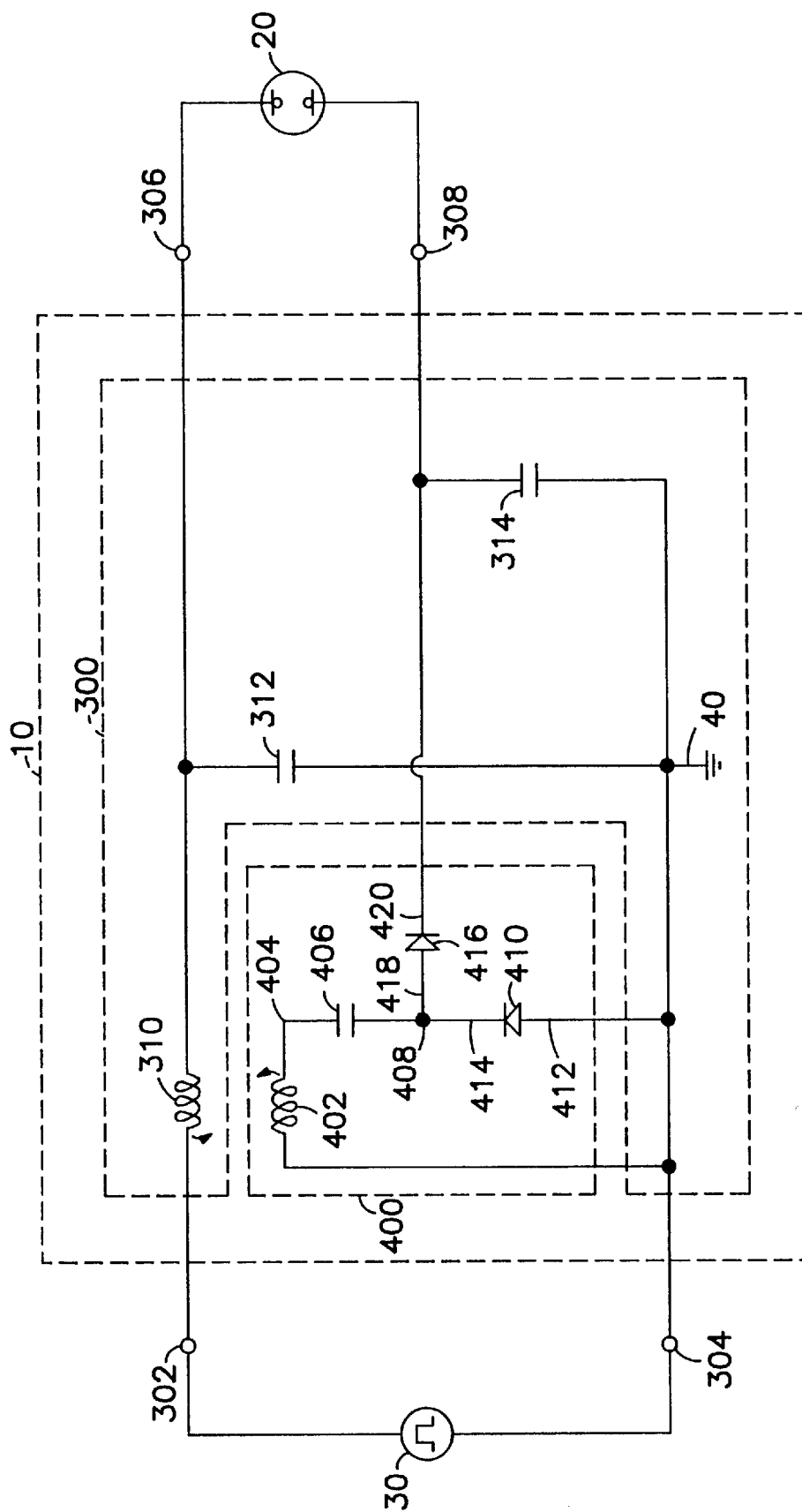
FIG. 1 describes a ballast with a lamp starting circuit, in accordance with a preferred embodiment of the present invention.

FIG. 1 describes a ballast 10 for powering a discharge lamp 20. Ballast 10 includes an output circuit 300 and a starting circuit 400. Output circuit 300 comprises first and second input connections 302,304, first and second output connections 306,308, a resonant inductor 310, a resonant capacitor 312, and a direct current (DC) blocking capacitor 314. Input connections 302,304 are adapted to receive a source of substantially squarewave voltage 30. Second input connection 304 is coupled to a circuit ground node 40. Output connections 306,308 are coupleable to discharge lamp 20. Resonant inductor 310 is coupled between first input connection 302 and first output connection 306. Resonant capacitor 312 is coupled between first output connection 306 and circuit ground node 40. DC blocking capacitor 314 is coupled between second output connection 308 and circuit ground node 40.

Lamp starting circuit 400 is magnetically coupled to resonant inductor 310. During operation, lamp starting circuit 400 supplies charging current to DC blocking capacitor 314. The charging current causes the voltage across DC blocking capacitor 314 to build up and eventually reach a level that is high enough to ignite lamp 20. Lamp starting circuit 400 preferably comprises a starting winding 402, a current-limiting capacitor 406, a first rectifier 410, and a second rectifier 416. Starting winding 402 is magnetically coupled to resonant inductor 310, and is electrically coupled between circuit ground node 40 and a first node 404. Current-limiting capacitor 406 is coupled between first node 404 and a second node 408. First rectifier 410 has an anode 412 coupled to circuit ground node 40, and a cathode 414 coupled to second node 408. Second rectifier 416 has an anode 418 coupled to second node 408, and a cathode 420 coupled to DC blocking capacitor 314 at second output connection 308.

Starting winding 402 is preferably wound on the same bobbin and core as resonant inductor 310. The number of wire turns for starting winding 402 relative to that of resonant inductor 310 is dictated by several considerations, including the starting voltage requirements of lamp 20, the peak value of the squarewave voltage between input connections 302,304, and the frequency of squarewave voltage source 30 relative to the natural series resonant frequency of resonant inductor 310 and resonant capacitor 312. More specifically, the required relative number of turns for starting winding 402 increases if: (i) the required lamp starting voltage increases; or (ii) the peak value of the squarewave voltage decreases; or (iii) the frequency of squarewave source 30 is moved further away from the natural series resonant frequency of resonant inductor 310 and resonant capacitor 312. Conversely, fewer turns are required for starting winding 402 if: (i) the required lamp starting voltage decreases; or (ii) the peak value of the squarewave voltage increases; or (iii) the frequency of squarewave source 30 is moved closer to the series resonant frequency of inductor 310 and capacitor 312. For example, in a prototype ballast configured substantially as shown in FIG. 1, the peak value of the squarewave voltage was 225 volts, squarewave source 30 had a frequency of approximately 25,000 hertz, and the natural resonant frequency of inductor 310 (L=635 microhenries) and capacitor 312 (C=5.6 nanofarads) was approximately 27,000 hertz. In order to provide a peak voltage of approximately 2000 volts across DC blocking capacitor 314 for igniting lamp 20, it was required that starting winding 402 have approximately twice the number of wire turns as resonant inductor 310.

It is highly desirable that lamp starting circuit 400 exert little or no influence on the lamp 20 after the lamp ignites and begins to conduct an alternating current in a normal fashion. The charging current provided by starting circuit 400 tends to produce a direct current (DC) component in the current through lamp 20. Having a significant DC component in the lamp current is generally considered undesirable from the standpoint of lamp life. It is therefore preferred that, during normal operation of the lamp, the amount of charging current supplied to DC blocking capacitor 314 by lamp starting circuit 400 be at least an order of magnitude less than the root-mean-square (rms) value of the alternating current through lamp 20. For example, for a 70 watt HID lamp that operates with a rms current of about 700 milliamperes or so, a DC component of 10 milliamperes or less poses no significant detriment to the operating life of the lamp.

Current-limiting capacitor 406 is chosen to provide an impedance that is large enough to limit the charging current to a value that is very small in comparison with the rms value of the AC current that flows through lamp 20 during normal operation. For example, in a prototype ballast configured substantially as shown in FIG. 1 and in which squarewave source 30 had a frequency of approximately 25,000 hertz, capacitor 406 was chosen to have a capacitance of 47 picofarads. This value of capacitance provides sufficient impedance to limit the current provided by starting circuit 400 to substantially less than about 10 milliamperes during normal operation of lamp 20.

First and second rectifiers 410,416 must be capable of withstanding at least the peak voltage across DC blocking capacitor 314. For example, if the peak voltage across capacitor 314 is 2000 volts, then diodes 410,416 should each have a peak reverse voltage rating of, say, 3000 volts or so.

Alternatively, rectifiers 410,416 can each be implemented using, say, two 1600 volt rated diodes connected in series. Similarly, current-limiting capacitor 406 must also have a sufficiently high peak voltage rating (e.g., 3000 volts).

Figure 2:
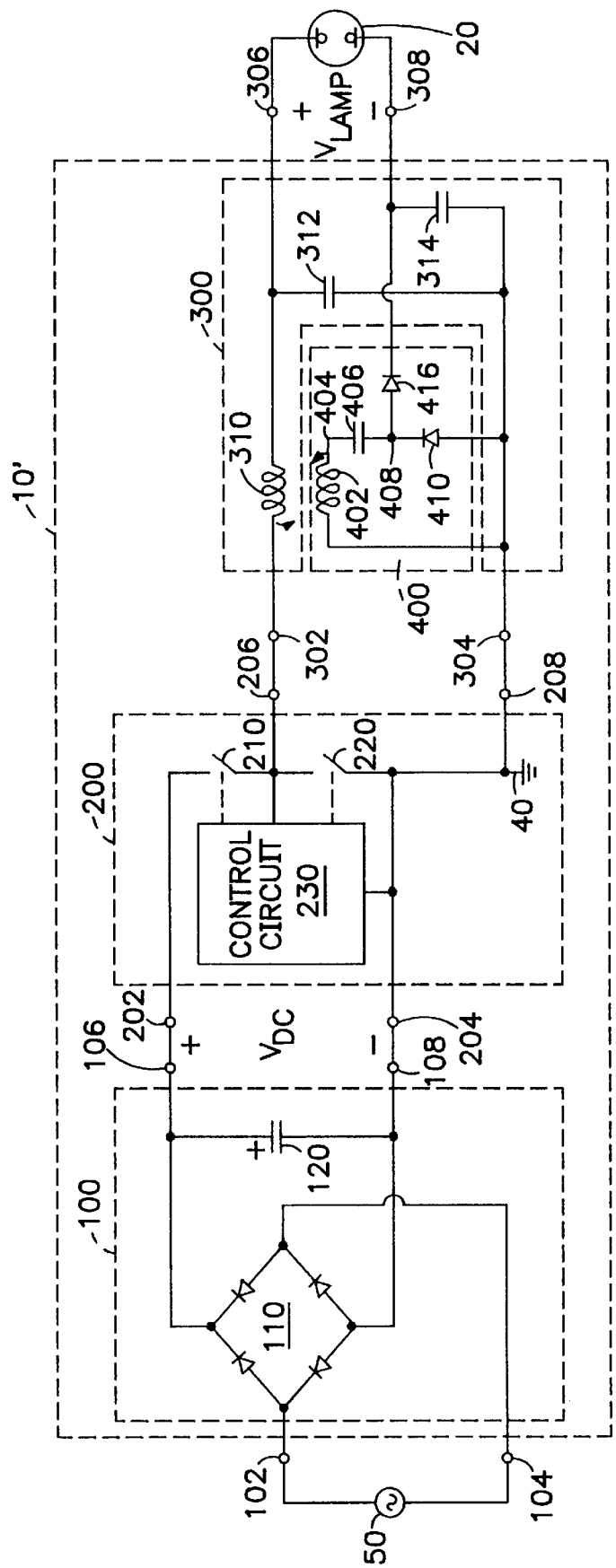
FIG. 2 describes the ballast of FIG. 1 with a rectifier circuit and an inverter, in accordance with a preferred embodiment of the present invention.

Turning now to FIG. 2, ballast 10' includes an inverter 200 having first and second input terminals 202,204 adapted to receive a source of substantially direct current (DC) voltage, $V_{DC}$, and first and second output terminals 206,208 coupled to the input connections 302,304 of output circuit 300. During operation, inverter 200 provides a substantially squarewave voltage between output terminals 206,208. More specifically, the voltage between output terminals 206,208 periodically varies between zero and $V_{DC}$.

Inverter 200 may be implemented using any of a number of known inverter circuit topologies. As described in FIG. 2, inverter 200 is a half-bridge type inverter comprising a first inverter switch 210, a second inverter switch 220, and a control circuit 230. First inverter switch 210 is coupled between first input terminal 202 and first output terminal 206. Second inverter switch 220 is coupled between first output terminal 206 and circuit ground node 40. Inverter switches 210,220 may be implemented using any of a number of controllable power switching devices, such as bipolar junction transistors (BJTs) or field-effect transistors (FETs). Control circuit 230 is coupled to inverter switches 210,220 and is operable to turn the inverter switches on and off in a substantially complementary fashion and at a high frequency rate that is preferably greater than 20,000 Hertz. Control circuit 230 may be implemented using a suitable device, such as the IR2151 high-side driver integrated circuit manufactured by International Rectifier, along with associated peripheral circuitry. Preferably, and in order to avoid excessive power dissipation and electrical stress on the components of the inverter and output circuit, control circuit 230 should commutate inverter switches 210,220 at an operating frequency that is somewhat removed from the natural series resonant frequency of inductor 310 and capacitor 312. Conversely, in order to keep the required number of turns for starting winding 402 within manageable limits, the operating frequency should still be close enough to the resonant frequency to provide a fair amount of resonant voltage gain prior to ignition of lamp 20. As a rule of thumb, if the resonant frequency is in the range of 20–50 kilohertz, the operating frequency should be chosen to be approximately 2–4 kilohertz away from the resonant frequency.

Referring again to FIG. 2, ballast 10' further includes a rectifier circuit 100 having a pair of input connections 102,104 adapted to receive a source of alternating current 50, and a pair of output connections 106,108 coupled to the input terminals 106,108 of inverter 200. Rectifier circuit 100 includes a full-wave diode bridge 110 and a bulk capacitor 120. Although not described in the drawings, rectifier circuit 100 may optionally include a switching converter, such as a boost type converter, interposed between the diode bridge 110 and bulk capacitor 120, for providing power factor correction and other benefits well known to those skilled in the art of power supplies and electronic ballasts.

The detailed operation of ballast 10' is now explained with reference to FIG. 2 as follows. When inverter 200 first begins to operate, DC blocking capacitor 314 is initially uncharged. Lamp 20 is initially off, and remains off until at least such time as the voltage between output connections 306,308 reaches a value that is high enough to establish an arc in the lamp. With inverter 200 operating, the voltage between input connections 302,304 periodically varies between zero and $V_{DC}$. Consequently, periodic voltages develop across resonant inductor 310 and resonant capacitor 312. The peak values of the voltages across inductor 310 and capacitor 312 are dependent upon the value of $V_{DC}$, as well as the frequency at which control circuit 230 commutates inverter switches 210,220 relative to the natural resonant frequency of inductor 310 and capacitor 312. When DC blocking capacitor 314 is substantially uncharged, $V_{LAMP}$ is approximately equal to the voltage across resonant capacitor 312. Because inverter 200 is operated at a frequency somewhat removed from the natural resonant frequency of inductor 310 and capacitor 312, the voltage across capacitor 312 is, by itself, generally too low to effect ignition of lamp 20. It should be appreciated that operating inverter 200 at the exact resonant frequency of inductor 310 and capacitor 312 may, in some cases at least, produce an extremely high voltage across capacitor 312 that would by itself be sufficient to ignite lamp 20. However, this approach is not desirable since the resulting current and voltage stresses on the inverter and output circuit components would require that these components have very high ratings and significantly higher monetary cost. It is thus desirable to operate inverter 200 at a frequency that is at least somewhat removed from resonance and to rely primarily on the voltage across DC blocking capacitor 314 to effect ignition of lamp 20.

With an AC voltage present across resonant inductor 310, a proportional AC voltage develops across starting winding 402. During at least a portion of each positive half-cycle (i.e., when the voltage between node 404 and circuit ground node 40 is positive), diode 416 is forward-biased and charging current flows out of winding 402, through capacitor 406 and diode 416, and into DC blocking capacitor 314; diode 410 is reverse-biased during the positive half-cycles. During the negative half-cycles (i.e., when the voltage between node 404 and circuit ground node 40 is negative), diode 410 is forward-biased and current flows up from ground node 40 through capacitor 406 and into winding 402; during the negative half-cycles, diode 416 is reverse-biased, so no current flows into or out of DC blocking capacitor 314. During subsequent positive half-cycles, charging current is again provided to DC blocking capacitor 314. The voltage across DC blocking capacitor thus builds up during the positive half-cycles and remains flat during the negative half-cycles. In this way, the voltage across DC blocking capacitor eventually (e.g., within less than 100 milliseconds after inverter 200 begins to operate) builds up to a level that is sufficient (e.g., 2000 volts or so) to ignite lamp 20.

After lamp 20 ignites and begins to operate in a normal manner, the voltage across DC blocking capacitor 314 assumes a steady-state value that is approximately equal to $V_{DC}/2$. During this time, starting circuit 400 continues to provide a small amount of charging current to DC blocking capacitor 314 during the positive half-cycles of the voltage across winding 402. However, due to the fact that lamp 20 is now operating and thus exerting a "loading" effect on the resonant circuit, the voltage across resonant inductor 310 is significantly lower than it was prior to ignition of lamp 20. Correspondingly, the voltage across starting winding 402 is also lower, with the result that the charging current is considerably reduced over what it was prior to ignition of lamp 20. Due to the relatively large reactive impedance (e.g., 100,000 ohms or so) of capacitor 406 and the reduced voltage across starting winding 402 after lamp 20 ignites and begins to operate, the charging current is quite small (e.g., less than 10 milliamperes) in comparison with the rms value (e.g., 700milliamperes) of the AC current through lamp 20. Consequently, the DC component in the lamp current is relatively small and thus has little or no detrimental effect upon the operating life of lamp 20.

Output circuit 300 and starting circuit 400 efficiently provide a high voltage for igniting a discharge lamp. At the same time, starting circuit 400 is passively prevented from interfering with or detracting from normal operation of the discharge lamp. Starting circuit 400 thus requires only simple circuitry and is devoid of any need for expensive power switches or breakdown devices. Additionally, output circuit 300 and starting circuit 400 avoid any need for special magnetic components such as pulse coils, and are well-suited for igniting and operating remotely located discharge lamps.

Although the present invention has been described with reference to certain preferred embodiments, numerous modifications and variations can be made by those skilled in the art without departing from the novel spirit and scope of this invention.

What is claimed is:

1. A ballast and high-intensity discharge lamp arrangement, comprising:
   an inverter having first and second input terminals adapted to receive a source of substantially DC voltage, and first and second output terminals, wherein the inverter is operable to provide a substantially square wave voltage between the first and second output terminals;
   a first series combination of a resonant inductor and a resonant capacitor, the first series combination being coupled between the first and second output terminals of the inverter;
   a second series combination of a DC blocking capacitor and a high-intensity discharge lamp, the second series combination being coupled in parallel with the resonant capacitor; and
   a lamp starting circuit operable to supply a charging current to the DC blocking capacitor so as to provide a high voltage thereacross for igniting the lamp, wherein:
   (i) during normal operation of the lamp, the charging current is at least an order of magnitude less than the root-mean-square alternating current that flows through the lamp; and
   (ii) the lamp starting circuit comprises:
      a starting winding magnetically coupled to the resonant inductor, and electrically coupled between a first node and the second output terminal of the inverter;
      a current-limiting capacitor coupled between the first node and a second node;
      a first rectifier having an anode coupled to the second output terminal of the inverter, and a cathode coupled to the second node; and
      a second rectifier having an anode coupled to the second node and a cathode coupled to a junction between the lamp and the DC blocking capacitor.

2. A ballast for powering at least one discharge lamp, comprising:
   an inverter having first and second input terminals adapted to receive a source of substantially DC voltage, and first and second output terminals coupled to the input connections of the output circuit, wherein the second output terminal is coupled to a circuit ground node and the inverter is operable to provide a substantially square wave voltage between the first and second output terminals;
   an output circuit, comprising:
      first and second input connections coupled to the first and second output terminals of the inverter,
      first and second output connections coupleable to at least one discharge lamp;
      a resonant inductor coupled between the first input connection and the first output connection;
      a resonant capacitor coupled between the first output connection and the circuit ground node; and
      a DC blocking capacitor coupled between the second output connection and the circuit around node; and
   a lamp starting circuit magnetically coupled to the resonant inductor and operable to supply a charging current to the DC blocking capacitor so as to provide a high voltage thereacross for igniting the lamp, wherein, during normal operation of the lamp, the amount of charging current supplied to the DC blocking capacitor by the lamp starting circuit is:
   (i) at least an order of magnitude less than the root-mean-square value of the alternating current that flows through the lamp; and
   (ii) less than about ten milliamperes; and
   wherein the lamp starting circuit comprises:
      a starting winding magnetically coupled to the resonant inductor, and electrically coupled between the circuit ground node and a first node;
      a current-limiting capacitor coupled between the first node and a second node;
      a first rectifier having an anode coupled to the circuit ground node, and cathode coupled to the second node; and
      a second rectifier having an anode coupled to the second node and a cathode coupled to the second output connection.

3. The ballast of claim 2, wherein the inverter further comprises:
   a first inverter switch coupled between the first input terminal and the first output terminal;
   a second inverter switch coupled between the first output terminal and the circuit ground node; and
   a control circuit coupled to the first and second inverter switches and operable to turn the first and second inverter switches on and off in a substantially complementary fashion.

4. The ballast of claim 2, further comprising a rectifier circuit having a pair of input connections adapted to receive a source of alternating current, and a pair of output connections coupled to the inverter.

5. The ballast of claim 2, wherein the lamp is a high-intensity discharge lamp.

6. A ballast for powering a discharge lamp, comprising:
   an output circuit, comprising:
      first and second input connections adapted to receive a source of substantially square wave voltage, wherein the second input connection is coupled to a circuit around node;
      first and second output connections coupled to a discharge lamp;
      a resonant inductor coupled between the first input connection and the first output connection;
      a resonant capacitor coupled between the first output connection and the circuit ground node; and
      a DC blocking capacitor coupled between the second output connection and the circuit around node; and
   a lamp starting circuit magnetically coupled to the resonant inductor and operable to supply a charging current to the DC blocking capacitor so as to provide a high voltage thereacross for igniting the lamp, wherein the lamp starting circuit comprises:
      a starting winding magnetically coupled to the resonant inductor, and electrically coupled between the circuit ground node and a first node;
      a current-limiting capacitor coupled between the first node and a second node;
      a first rectifier having an anode coupled to the circuit ground node, and a cathode coupled to the second node; and
      a second rectifier having an anode coupled to the second node and a cathode coupled to the second output connection.

7. The ballast of claim 6, wherein, during normal operation of the lamp, the amount of charging current supplied to the DC blocking capacitor by the lamp starting circuit is at least an order of magnitude less than the root-mean-square value of the alternating current that flows through the lamp.

8. The ballast of claim 6, wherein, during normal operation of the lamp, the amount of charging current supplied to the DC blocking capacitor by the lamp starting circuit is less than about ten milliamperes.

9. The ballast of claim 6, further comprising a rectifier circuit having a pair of input connections adapted to receive a source of alternating current, and a pair of output connections coupled to the input terminals of the inverter.

10. The ballast of claim 6, wherein the lamp is a high-intensity discharge lamp.

11. The ballast of claim 6, further comprising an inverter having first and second input terminals adapted to receive a source of substantially DC voltage, and first and second output terminals coupled to the input connections of the output circuit, wherein the inverter is operable to provide a substantially square wave voltage between the first and second output terminals.

12. The ballast of claim 11, wherein the inverter further comprises:
   a first inverter switch coupled between the first input terminal and the first output terminal;
   a second inverter switch coupled between the first output terminal and the circuit ground node; and
   a control circuit coupled to the first and second inverter switches and operable to turn the first and second inverter switches on and off in a substantially complementary fashion.

* * * * *